United States Patent [19]
Parker

[11] 3,876,958

[45] Apr. 8, 1975

[54] EXTENDED AREA CATHODE FOR TRANSVERSE DISCHARGE GAS LASERS

[75] Inventor: Jerald V. Parker, Malibu, Calif.

[73] Assignee: Hughes Aircraft Company, Culver City, Calif.

[22] Filed: Dec. 14, 1975

[21] Appl. No.: 424,975

[52] U.S. Cl........ 331/94.5 G; 330/4.3; 331/94.5 PE
[51] Int. Cl........................... H01s 3/22; H01s 3/09
[58] Field of Search..................... 331/94.5; 330/4.3

[56] References Cited
OTHER PUBLICATIONS

Rusbueldt et al. Atomkern Energie (ATKE) Vol. 19, No. 3, May 1972, pp 211–16.
Pan, Review of Scientific Instruments, Vol. 43, No. 4, April 1972, pp 662–6.

Primary Examiner—Robert J. Webster
Attorney, Agent, or Firm—W. H. MacAllister; P. M. Coble

[57] ABSTRACT

Laser cathodes of extended emission area are disclosed having a plurality of substantially aligned electrically conductive plates spaced from one another and disposed in respective planes perpendicular to the longitudinal axis of the laser housing. Adjacent plates are spaced by a spacing s selected to achieve the "hollow" cathode effect and satisfying the relation $s = k/p$ where $p$ is the laser gas pressure and $k$ is a constant determined by the laser gas and lying in the range of from about 5 to about 20 Torr-cm. In one emboidment the cathode plates are supported by and attached to a pair of longitudinally extending electrically conductive rods. In another embodiment the cathode consists of a laminated array of alternatively disposed aligned taller and shorter electrically conductive plates.

8 Claims, 5 Drawing Figures

EXTENDED AREA CATHODE FOR TRANSVERSE DISCHARGE GAS LASERS

This invention relates to lasers, and more particularly relates to a transverse discharge gas laser having an improved cathode which provides increased surface area of electron emission for a given discharge area.

The invention herein described was made in the course of or under a contract or subcontract thereunder with the United States Air Force.

In many pulsed, transverse discharge gas lasers, especially those utilizing a large volume, moderate-to-high pressure gaseous medium, the output energy density is limited by non-uniformities in the glow discharge used to excite the laser gas. These non-uniformities take the form of concentrated arc discharges which occur when the input energy density is increased to a certain level, thereby placing a limit on the energy which is available to excite the laser medium.

In order to reduce the tendency toward arc formation in lasers of the foregoing type, various cathode designs have been employed. These include cathodes with mildly curved emissive surfaces designed to provide a more uniform cathode current by eliminating sharp corners which give rise to high electric fields, grooved cathodes wherein preliminary discharge initiating trigger wires are embedded in insulating rods disposed in the cathode grooves, and "brush" cathodes consisting of a dense array of pin-like electron emitters. However, none of these cathodes are able to deposit sufficient energy into the laser gas without arc formation to achieve the output energy densities desired for certain applications.

Accordingly, it is an object of the present invention to provide an improved cathode for a pulsed, transverse discharge gas laser which enables increased output energy densities to be achieved.

It is a further object of the invention to provide a transverse discharge laser cathode having an increased surface area of electron emission for a given discharge area.

It is still another object of the invention to provide a laser cathode which reduces any tendency toward parasitic laser oscillations.

A cathode according to the invention finds use in a gas laser wherein an anode and a cathode are longitudinally disposed in an elongated housing which contains the laser gas at a predetermined pressure. Electrical pulses are applied between the cathode and the anode to establish an electrical discharge in the gas between the cathode and anode in a direction substantially transverse to the longitudinal axis of the housing and thereby excite the gas to a lasing condition.

The cathode comprises a plurality of substantially aligned plates of an electrically conductive material having good electron emissive properties in the laser gas. The plates are spaced from one another and disposed in respective planes perpendicular to the longitudinal axis of the housing. Adjacent plates are separated by a spacing $s$ which satisfies the relation $s = k/p$ where $p$ is the predetermined pressure of the laser gas and $k$ is a constant determined by the laser gas and lying in the range of from about 5 to about 20 Torr-cm.

Additional objects, advantages and characteristic features of the invention will be readily apparent from the following detailed description of preferred embodiments of the invention when considered in conjunction with the accompanying drawings wherein.

Figure 2:
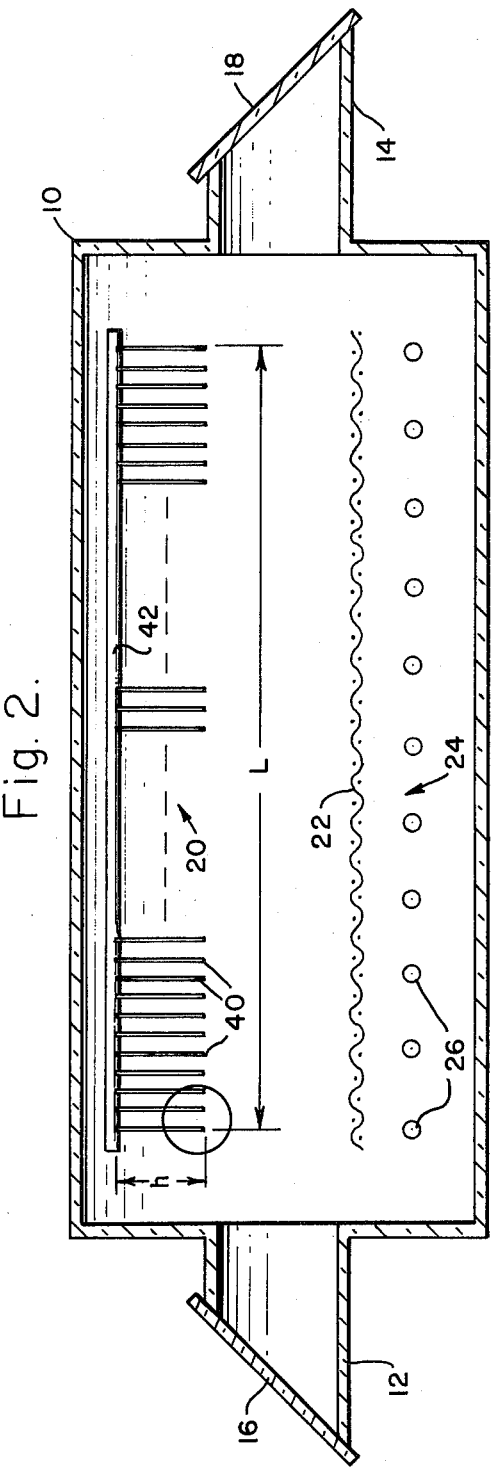
FIG. 2 is a partly schematic longitudinal sectional view of the laser of FIG. 1 as taken along line 2—2.
Figure 1:
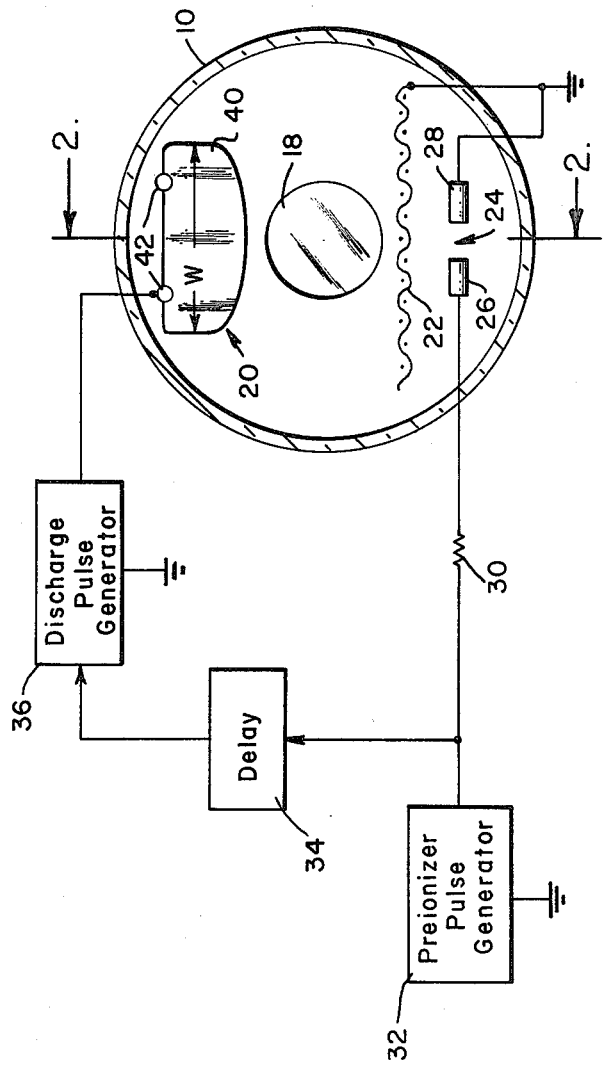
FIG. 1 is a cross-sectional view, partly in schematic form, illustrating a pulsed, transverse discharge gas laser incorporating an extended area cathode according to one embodiment of the invention.

Referring with greater particularity to FIGS. 1 and 2, there is shown a pulsed, transverse discharge gas laser comprising an elongated tubular housing 10 of electrically insulating material such as plastic. The respective ends of the housing 10 are provided with coaxially aligned reduced diameter tubular extensions 12 and 14. Window elements 16 and 18, illustrated as Brewster angle windows, are sealed to the outer ends of the respective housing extensions 12 and 14 to enable the generated laser beam to exit from the device. The interior of the housing 10 is filled with the desired gaseous laser medium which may be any gas capable of being excited to a lasing condition by means of an electrical discharge. As a specific example, the laser gas may be a mixture of $CO_2$, $N_2$ and He in the ratio of 1:1:8 by mole fraction. The housing 10 is hermetically sealed to maintain the laser gas at a predetermined pressure. Exemplary gas pressures may range from atmospheric pressure to as low as around 10–20 Torr.

In order to establish a transverse electrical discharge within the housing 10 which excites the laser gas to a lasing condition, an elongated cathode 20 and anode 22 are disposed within the housing 10 on opposite sides of the longitudinal axis of the housing. The cathode 20 is constructed with an extended emission area in accordance with the principles of the invention and will be discussed more fully below. The anode 22 may take the form of a wire screen so as to enable ultraviolet radiation from a preionizer electrode array 24 disposed beneath the anode 22 to enter the discharge region between anode 22 and cathode 20. It should be understood, however, that other anode figurations such as an extended plate or plates may be employed instead, in which case the preionizer 24 could be omitted or relocated to the side of the discharge region.

The preionizer electrode array 24 may consist of a plurality of spaced pairs of axially aligned electrode segments 26 and 28 disposed in a plane parallel to anode 22 and located beneath anode 22. In the specific arrangement illustrated in FIGS. 1 and 2, the electrode segments 28 on one side of the preionizer 24 are electrically connected to a common potential level (illustrated as ground) to which the anode 22 is also connected. The respective electrode segments 26 on the opposite side of the preionizer 24 are connected via respective resistors 30 to the output from a preionizer pulse generator 32. The output from the preionizer pulse generator 32 is also applied via a delay network 34 to a discharge pulse generator 36 having its output connected to the cathode 20.

Figure 3:
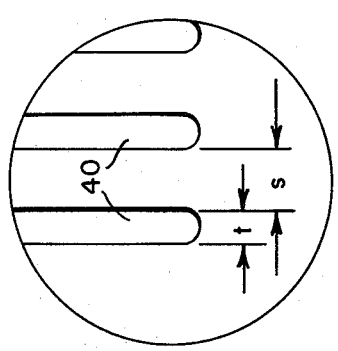
FIG. 3 is an enlarged side view showing the encircled portion of the cathode in FIG. 2.

An extended area cathode 20 according to the invention comprises a series of spaced, substantially aligned plates 40 mounted parallel to one another in respective planes perpendicular to the longitudinal axis of the housing 10. The plates 40 are made of an electrically conductive material having good electron emissive properties in the particular laser gas employed. Specific exemplary materials which may be used for the cathode plates 40 are stainless steel, copper, nickel and graphite. The plates 40 are attached, by brazing for example, to a pair of longitudinally extending electrically conductive support rods 42 and extend from the rods 42 toward the anode 22. In order to eliminate sharp corners and resulting high electric field points in the discharge region, the cathode plates 40 are preferably configured in a Rogowski profile. The cathode 20 has an overall length L, while the cathode plates 40 each have a height $h$ and width $w$. As shown in FIG. 3, each plate 40 has a thickness $t$, with adjacent plates 40 being separated by a spacing $s$.

The emission area $A_c$ for the cathode 20 is given by $$A_c = 2hwn \quad (1)$$

where $h$ and $w$ are the height and width, respectivley, of the plates 40, and n is the number of plates in the cathode. Since the number of plates $n$ is given by $$n = L/(t+s) \quad (2)$$

where $L$ is the cathode length, and $t$ and $s$ are plate thickness and spacing, respectively, the cathode emission $A_c$ becomes $$A_c = (2hwL)/(t+s) \quad (3)$$

The emission area $A_c$ of the cathode 20 actually is limited by the effective height $h'$ of the plates 40 which is the depth to which the discharge can penetrate into the slots between the plates 40 by reason of the "hollow" cathode effect, and in practice this discharge penetration depth is limited to about 10 times the plate spacing $s$.

In order to maximize the cathode emission area $A_c$, the plate height h should be not less than about ten times the plate spacing $s$, whi;e the plate thickness $t$ and spacing $s$ should be made of dimensions comparable to one another. Typically, the plate thickness $t$ is of a value ranging from about equal to the plate spacing $s$ to about one-fifth of the spacing $s$. The plate spacing s is selected to achieve the aforementioned "hollow" cathode effect, which requires that the spacing s be from about two to about ten times the normal cathode fall thickness. It has been found experimentally that the spacing s satisfies the relation $$s = k/p \quad (4)$$

where $p$ is the pressure of the laser gas and $k$ is a proportionality constant depending upon the particular gas employed and lying in the range of about 5 to 20 Torr-cm (for the aforementioned $CO_2$—$N_2$—He mixture, $k \approx 20$).

As a specific example, the following dimensions for the cathode 20 may be employed in constructing a laser according to FIGS. 1 and 2 when the aforementioned $CO_2$—$N_2$—He mixture (at atmospheric pressure) is employed as the laser medium. It should be understood, however, that this example is given solely for illustrative purposes and a wide range of other parameter values are also suitable.

$L = 50$ cm
$w = 3$ cm
$h = 3$ mm
$t = 0.3$ mm
$s = 0.3$ mm

With a cathode-anode spacing of 3 cm in the foregoing exemplary laser, the discharge pulse generator 36 may provide 25 Kv output pulses at a total energy of about 140 joules, while output pulses from preionizer pulse generator 32 of 15–20 Kv at an energy of about 1–2 joules woulc be suitable. Typical pulse durations may range essentially from 0.1 to 10 $\mu$sec.

In the operation of a laser according to FIGS. 1 and 2, an output inpulse from preionizer pulse generator 32 initiates a preliminary electrical discharge between electrode segments 26 and 28 of preionizer 24. This preliminary discharge generates ultraviolet photons which in turn produce background ionization in the laser gas. After the time delay provided by delay network 34 (typically about 1 to 10 $\mu$sec) which enables the background ionization to penetrate into the region between the cathode plates 40 and building up to a desired level, the discharge pulse generator 36 applied output pulses to the cathode 20 causing electron emission therefrom. A main electrical discharge is thus established in the region of the laser gas between the cathode 20 and anode 22 which excites the gas to a lasing condition.

As was indicated above, an extended area cathode according to the invention enables increased laser output energy densities to be achieved by allowing the input energy density for the laser pumping discharge to be increased without the occurrence of undesired arc discharges. This is accomplished by providing an increased cathode emission area for a given discharge cross-sectional area.

The energy per unit volume $U_r$ deposited into a pulsed electrical discharge in a gas is given by $$U_r = J_d E \pi_p \quad (5)$$

where $J_d$ is the current density (i.e., current per unit cross-sectional area) in the discharge, $E$ is the electric field in the discharge region, and $\pi_p$ is the duration of the discharge energizing pules.

For cathodes according to the prior art, the discharge current density $J_d$ is equal to the cathode current density $J_c$, so that Equatin (5) becomes $$U_r = J_c E \pi_p \quad (6)$$

It has been observed that arc formation occurs in such discharges when the product $J_c \pi_p$ exceeds a maximum value of emitted charge per unit area $q_{max}$. Thus, the maximum input energy per unit volume $U_{max}$ which may be desposted into an electrical discharge before arc formation occurs using prior art cathode is limited to $$U_{max} = Eq_{max} \quad (7)$$

For a cathode according to the invention, the discharge current density $J_d$ is not equal to the cathode current density $J_c$, but rather the discharge current density $J_d$ is related to the cathode current density $J_c$ by $$J_d A_d J_r A_c \quad (8)$$

where $A_d$ is the discharge cross-sectional area and $A_c$ is the cathode emission area. Solving Equation (8) for the current density $J_d$ and substituting the result in Equation (5) gives $$U_r = (A_c/A_d) J_c E \pi_p \quad (9)$$

The maximum input energy per unit volume $U'_{max}$ which may be deposited into a discharge before arc formation occurs using a cathode according to the invention is thus given by $$U_{max}' = (A_c/A_d) E q_{max} \quad (10)$$

For a given gas mixture and pressure, the electric field E is essentially constant. Thus, by comparing Equations (7) and (10), it may be seen that the energy density which may be deposited into the discharge before arc formation occurs with a cathode according to the invention is increased by the ratio of the cathode emission area to the discharge cross-sectional area. Since a cathode according to the invention provides a vastly increased emission area for a given discharge cross-sectional area, a considerable increase in the discharge input energy density may be achieved. As a result, a cathode according to the invention enables pulsed, transverse discharge gas lasers to provide greater output energy densities than heretofore has been achieved. Moreover, because of absorption of optical energy in the slots between the cathode plates and optical scattering at the plate edges, the cathode of the invention reduces any tendency toward parasitic laser oscillations.

Figure 5:
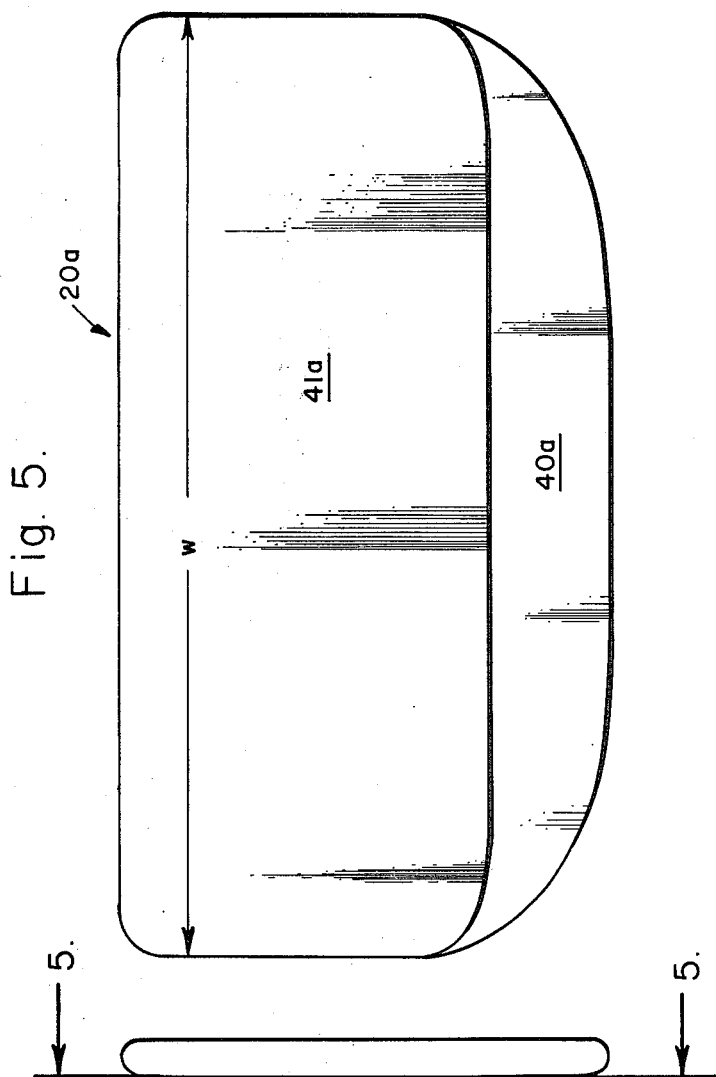
FIG. 5 is a sectional view taken along line 5—5 of FIG. 4.
Figure 4:
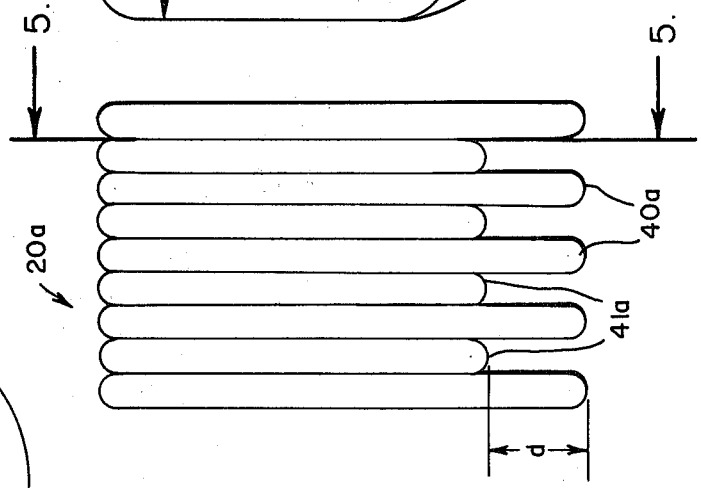
FIG. 4 is a side view of a laser cathode according to another embodiment of the invention.

An extended area laser cathode according to another embodiment of the invention is illustrated in FIGS. 4 and 5. Components in the embodiments of FIGS. 4–5 which correspond to respective components in the embodiment of FIGS. 1–3 are designated by the same reference numerals as their corresponding components in FIGS. 1–3 but with the addition of the suffix $a$.

In the embodiment of FIGS. 4–5 extended area cathode 20a consists of a laminated array of alternately disposed aligned taller and shorter electrically conductive plates 40a and 41a, respectively. The plates 40a and 41a may be of a metal such as stainless steel and may be brazed together or held in the desired assembled relationship by fastening devices such as bolts or rivets. The taller plates 40a extend beyond the ends of the shorter plates 41a by a distance $d$ (which is functionally equivalent to the cathode height h in the embodiment of FIGS. 1–3), and the exposed surfaces of the plates 40a function as the extended area cathode emissive surface.

Although the invention has been shown and described with reference to particular embodiments, nevertheless various changes and modifications obvious to a person skilled in the art to which the invention pertains are deemed to lie within the spirit, scope and contemplation of the invention.

What is claimed is:

1. In a gas laser having an elongated housing containing a laser gas at a predetermined pressure, an anode and a cathode longitudinal axis thereof, and means for applying electrical pulses between said cathode and anode to establish an electrical discharge in said gas between said cathode and anode in a direction substantially transverse to said longitudinal axis whereby said gas is excited to a lasing condition, the improvement in said cathode comprising:

a plurality of substantially aligned plates of an electrically conductive material having good election emissive properties in said laser gas spaced from one another and disposed in respective planes perpendicular to said longitudinal axis, the spacing $s$ between adjacent ones of said plates satisfying the relation $s = k/p$ where $p$ is the predetermined pressure of said laser gas and $k$ is a constant determined by said laser gas and lying in the range of about 5 to about 20 Torr-cm.

2. The improvement according to claim 1 wherein each of said plates has a thickness of a value lying in the range of from about the same as said spacing $s$ to about one-fifth of said spacing $s$.

3. The improvement according to claim 1 wherein each of said plates has an extent along said direction substantially transverse to said longitudinal axis of not less than about 10 times said spacing $s$.

4. The improvement according to claim 1 wherein said plates are supported by and attached to at least one electrically conductive rod disposed parallel to said longitudinal axis.

5. In a gas laser having an elongated housing containing a laser gas at a predetermined pressure, an anode and a cathode longitudinally disposed in said housing on opposite sides of the longitudinal axis thereof, and means for applying electrical pulses between said cathode and anode to establish an electrical discharge in said gas between said cathode and anode in a direction substantially transverse to said longitudinal axis whereby said gas is excited to a lasing condition, the improvement in said cathode comprising:

first and second spaced electrically conductive rods disposed parallel to said longitudinal axis, a series of substantially aligned plates of an electrically conductive material having good electron emissive properties in said laser gas attached to said rods and extending toward said longitudinal axis, said plates being spaced from one another and disposed in respective planes perpendicular to said longitudinal axis, the spacing $s$ between adjacent ones of said plates satisfying the realtion $s = k/p$ where $p$ is the predetermined pressure of said laser gas and $k$ is a constant determined by said laser gas and lying in the range of from about 5 to about 20 Torr-cm, said plates having a thickness of a value lying in the range of from about the same as said spacing $s$ to about one-fifth of said spacing $s$, and said plates having an extend along said direction substantially transverse to said longitudinal axis of not less than about 10 times said spacing $s$.

6. In a gas laser having an elongated housing containing a laser gas at a predetermined pressure, an anode and a cathode longitudinally disposed in said housing on opposite sides of the longitudinal axis thereof, and means for applying electrical pulses between said cathode and anode to establish an electrical discharge in said gas between said cathode and anode in a direction substantially transverse to said longitudinal axis whereby said gas is excited to a lasing condition, the improvement in said cathode comprising:

a laminated array of a series of first electrically conductive plates and a series of second electrically conductive plates alternately disposed along a direction parallel to said longitudinal axis, adjacent ones of said plates contacting and being secured to one anohter and lying in respective planes perpendicular to said longitudinal axis, said first plates being of a material having good electron emissive properties in said laser gas and being aligned with one another and extending beyond said second plates in a direction toward said longitudinal axis, the spacing s between adjacent ones of said first plates satisfying the relation $s = k/p$ where $p$ is the predetermined pressure of said laser gas and $k$ is a constant determined by said laser gas and lying in the range of from about 5 to about 20 Torr-cm.

7. The improvement according to claim 6 wherein each of said first plates has a thickness of a value lying in the range of from about the same as said spacing s to about one-fifth of said spacing $s$.

8. The improvement according to claim 6 wherein said first plates extend beyond said second plates toward said longitudinal axis by not less than about 10 times said spacing $s$.

* * * * *